(12) United States Patent
Castro et al.

(10) Patent No.: US 8,382,401 B2
(45) Date of Patent: Feb. 26, 2013

(54) VARIABLE DIAMETER PNEUMATIC TUBE BRAKE

(75) Inventors: Raymond Anthony Castro, Denver, CO (US); Chad David Cornelius, Highlands Ranch, CO (US); Kenneth Michael Hoganson, Aurora, CO (US); James Joseph Podracky, Denver, CO (US); Robert Paul Trenconsky, Elizabeth, CO (US)

(73) Assignee: Translogic Corporation, Denver, CO (US)

( * ) Notice: Subject to any disclaimer, the term of this patent is extended or adjusted under 35 U.S.C. 154(b) by 539 days.

(21) Appl. No.: 12/574,909

(22) Filed: Oct. 7, 2009

(65) Prior Publication Data

US 2010/0221074 A1   Sep. 2, 2010

Related U.S. Application Data

(60) Provisional application No. 61/104,155, filed on Oct. 9, 2008.

(51) Int. Cl.
*B65G 51/20* (2006.01)
(52) U.S. Cl. .......................................... 406/83; 406/195
(58) Field of Classification Search .................... 406/83, 406/190–193, 195, 196, 184, 10, 110–112; 193/32, 40
See application file for complete search history.

(56) References Cited

U.S. PATENT DOCUMENTS

| | | | |
|---|---|---|---|
| 815,320 A * | 3/1906 | Carpenter | 104/138.1 |
| 933,527 A * | 9/1909 | Brown | 406/177 |
| 1,753,987 A | 4/1930 | Hohne | |
| 1,823,056 A | 9/1931 | Marburg | |
| 2,043,293 A | 6/1936 | Jennings | |
| 3,055,612 A | 7/1936 | Stout et al. | |
| 2,174,718 A | 10/1939 | Drenkard, Jr. | |
| 2,679,990 A | 6/1954 | Mathzeit et al. | |
| 2,707,042 A * | 4/1955 | Weiler | 193/40 |
| 2,709,555 A | 5/1955 | Schroder | |
| 2,773,658 A | 12/1956 | Otteren et al. | |
| 2,797,057 A | 6/1957 | Sindzinski et al. | |
| 2,815,182 A | 12/1957 | Mittag et al. | |
| 2,850,249 A | 9/1958 | Understadt | |
| 2,865,578 A | 12/1958 | Hennessy | |
| 2,943,814 A | 7/1960 | Mittag et al. | |
| 2,970,791 A | 2/1961 | Hafner et al. | |
| 2,997,253 A | 8/1961 | Mittag et al. | |
| 3,055,611 A | 9/1962 | Stout et al. | |
| 3,101,183 A * | 8/1963 | Hunter | 406/83 |
| 3,148,845 A | 9/1964 | Buchwald et al. | |
| 3,219,989 A | 11/1965 | Kuhrt et al. | |
| 3,223,353 A | 12/1965 | Kuhrt et al. | |
| 3,238,515 A | 3/1966 | Schrader et al. | |

(Continued)

FOREIGN PATENT DOCUMENTS

DE   4039436 A1 *  6/1992

*Primary Examiner* — Gene Crawford
*Assistant Examiner* — William R Harp
(74) *Attorney, Agent, or Firm* — Russell T. Manning; Marsh Fischmann & Breyfogle LLP

(57) ABSTRACT

A braking device and method is provided that is operative to selectively slow and/or stop a pneumatic carrier within a pneumatic carrier system. Generally, the device includes a pneumatic tube that is sized to permit the passage of pneumatic carriers. The pneumatic tube includes at least one braking element that may be disposed into the bore of the pneumatic tube to at least partially impede the passage of a pneumatic carrier through the bore. In one embodiment, the braking element is formed as a variable diameter section of the pneumatic tube that may be selectively constricted to change the diameter of the bore of the pneumatic tube. Such constriction may slow and/or stop the passage of a pneumatic carrier through the bore of the pneumatic tube.

23 Claims, 12 Drawing Sheets

U.S. PATENT DOCUMENTS

| | | | |
|---|---|---|---|
| 3,265,325 A | 8/1966 | Buchwald et al. | |
| 3,295,662 A | 1/1967 | Crosby et al. | |
| 3,332,639 A | 7/1967 | Joy | |
| 3,333,787 A | 8/1967 | Voitas et al. | |
| 3,352,512 A * | 11/1967 | James, Sr. | 104/138.1 |
| 3,361,384 A | 1/1968 | Thorburn | |
| 3,408,113 A | 10/1968 | Bouladon | |
| 3,507,460 A | 4/1970 | Norman et al. | |
| 3,629,231 A | 12/1971 | Kalthoff | |
| 3,813,058 A | 5/1974 | Smith et al. | |
| 3,892,372 A | 7/1975 | Hauber | |
| 4,058,274 A | 11/1977 | Hochradel et al. | |
| 4,234,271 A | 11/1980 | Kalina | |
| 4,240,768 A | 12/1980 | Carstens | |
| 4,502,215 A | 3/1985 | Davis et al. | |
| 4,509,123 A | 4/1985 | Vereen | |
| 4,516,888 A | 5/1985 | Kardinal | |
| 4,529,335 A | 7/1985 | Hilbert et al. | |
| 4,630,216 A | 12/1986 | Tyler et al. | |
| 4,646,245 A | 2/1987 | Prodel et al. | |
| 4,786,229 A | 11/1988 | Henderson | |
| 4,831,540 A | 5/1989 | Hesser | |
| 4,941,181 A | 7/1990 | Igarashi et al. | |
| 4,971,481 A | 11/1990 | Foreman | |
| 4,974,166 A | 11/1990 | Maney et al. | |
| 5,097,421 A | 3/1992 | Maney et al. | |
| 5,153,842 A | 10/1992 | Dulugos et al. | |
| 5,166,884 A | 11/1992 | Maney et al. | |
| 5,190,428 A | 3/1993 | Bryant et al. | |
| 5,196,846 A | 3/1993 | Brockelsby et al. | |
| 5,217,328 A | 6/1993 | Lang | |
| 5,217,329 A * | 6/1993 | Lang | 406/176 |
| 5,225,990 A | 7/1993 | Bunce et al. | |
| 5,234,292 A | 8/1993 | Lang | |
| 5,260,694 A | 11/1993 | Remahl | |
| 5,335,810 A * | 8/1994 | Holloway | 221/10 |
| 5,386,364 A | 1/1995 | Tyler | |
| 5,434,790 A | 7/1995 | Saka et al. | |
| 5,436,611 A | 7/1995 | Arlinghaus, Jr. | |
| 5,562,367 A | 10/1996 | Scott | |
| 5,655,677 A | 8/1997 | Fratello et al. | |
| 5,661,743 A | 8/1997 | Nagai | |
| 5,712,789 A | 1/1998 | Radican | |
| 5,864,485 A | 1/1999 | Hawthorne et al. | |
| 5,867,388 A | 2/1999 | Okumura et al. | |
| 5,959,568 A | 9/1999 | Woolley | |
| 6,024,208 A | 2/2000 | Chooi et al. | |
| 6,068,428 A | 5/2000 | Nair et al. | |
| 6,076,652 A | 6/2000 | Head, III | |
| 6,138,058 A | 10/2000 | Van Antwerp et al. | |
| 6,146,057 A | 11/2000 | Gromley et al. | |
| 6,173,212 B1 | 1/2001 | Valerino, Sr. | |
| 6,202,004 B1 | 3/2001 | Valerino, Sr. | |
| 6,290,434 B1 | 9/2001 | Celada-Gonzalez et al. | |
| 6,292,710 B1 | 9/2001 | Bonnet | |
| 6,356,802 B1 | 3/2002 | Takehara et al. | |
| 6,437,272 B2 | 8/2002 | Tamamoto et al. | |
| 6,477,442 B1 | 11/2002 | Valerino, Sr. | |
| 6,516,239 B1 | 2/2003 | Madden et al. | |
| 6,539,360 B1 | 3/2003 | Kadaba | |
| 6,600,418 B2 | 7/2003 | Francis et al. | |
| 6,659,693 B1 | 12/2003 | Perkins et al. | |
| 6,665,586 B1 | 12/2003 | Ball et al. | |
| 6,672,808 B1 | 1/2004 | McIntyre et al. | |
| 6,702,150 B2 | 3/2004 | Sumetzberger | |
| 6,711,463 B2 | 3/2004 | Tozuka et al. | |
| 6,747,560 B2 | 6/2004 | Stevens, III | |
| 6,762,382 B2 | 7/2004 | Danelski | |
| 6,878,896 B2 | 4/2005 | Braginsky et al. | |
| 6,887,358 B2 | 5/2005 | Elger | |
| 6,911,910 B2 | 6/2005 | Sansone et al. | |
| 6,932,544 B2 | 8/2005 | McMahon et al. | |
| 6,939,088 B2 | 9/2005 | Farrell | |
| 6,950,724 B2 | 9/2005 | Mileaf et al. | |
| 6,959,229 B2 | 10/2005 | Eidemiller | |
| 7,079,913 B2 | 7/2006 | Kato et al. | |
| 7,092,788 B2 | 8/2006 | Brixius et al. | |
| 7,104,734 B2 | 9/2006 | Smith et al. | |
| 7,136,721 B2 | 11/2006 | Sano et al. | |
| 7,151,980 B2 | 12/2006 | You et al. | |
| 7,196,627 B2 | 3/2007 | Rommelmann et al. | |
| 7,243,002 B1 | 7/2007 | Hoganson et al. | |
| 7,326,005 B1 | 2/2008 | Castro et al. | |
| 7,328,084 B1 | 2/2008 | Hoganson et al. | |
| 7,363,106 B1 | 4/2008 | Hoganson et al. | |

* cited by examiner

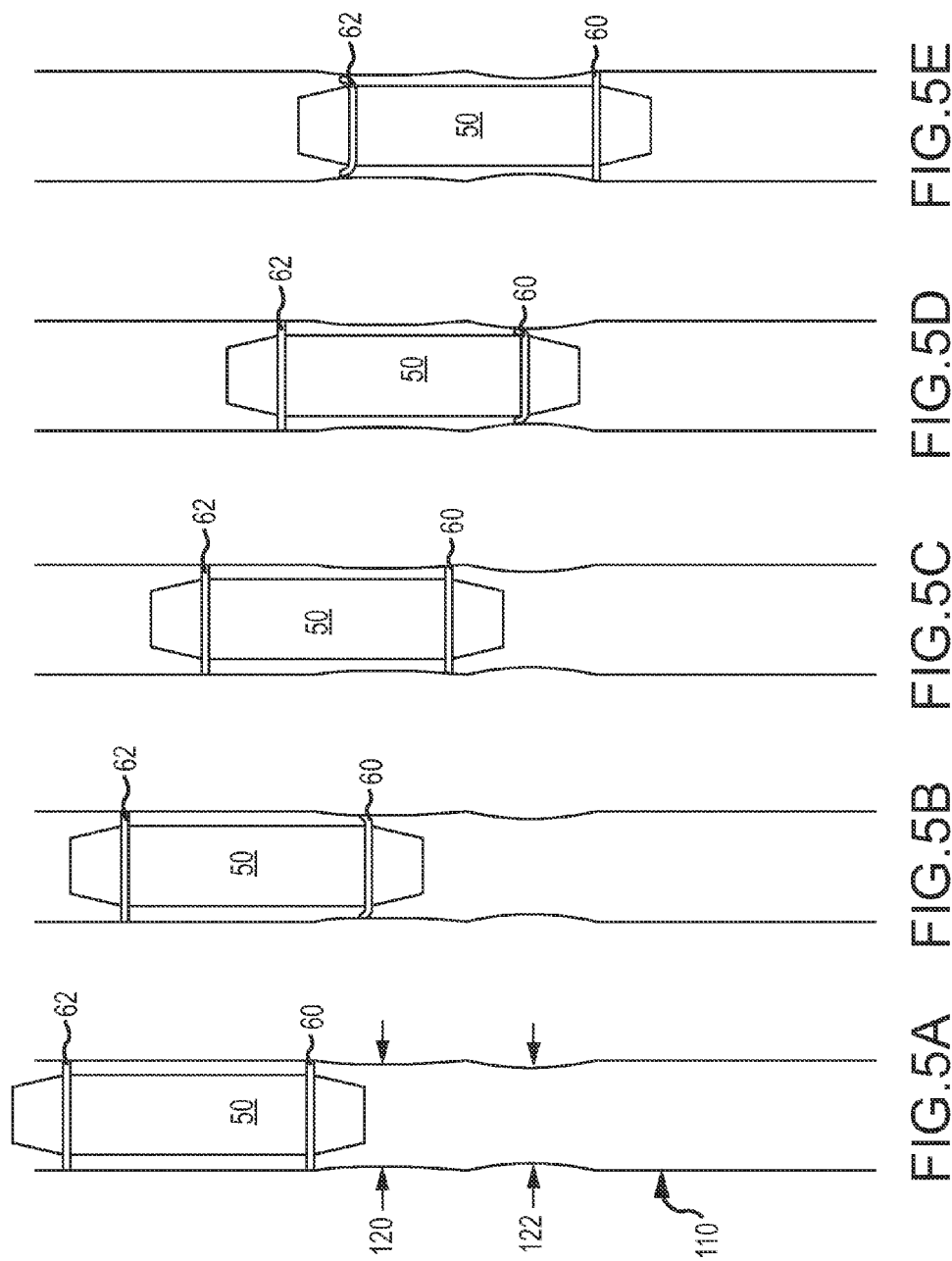

VARIABLE DIAMETER PNEUMATIC TUBE BRAKE

CROSS-REFERENCE TO RELATED APPLICATION

This application claims priority and the benefit of the filing date under 35 U.S.C. 119 to U.S. Provisional Application No. 61/104,155 entitled, "VARIABLE DIAMETER PNEUMATIC TUBE BRAKE," filed on Oct. 9, 2008, the contents of which are incorporated herein as if set forth in full.

FIELD OF INVENTION

The presented inventions relate generally to the field of pneumatic tube carrier systems. More particularly, the presented inventions relate to systems and methods for slowing and/or stopping a pneumatic carrier at a location within in a pneumatic tube carrier system.

BACKGROUND OF THE INVENTION

Pneumatic tube carrier systems are a well-known means for the automated transport of materials between, for example, an origination location to any one of a plurality of destination locations. A typical system includes a number of pneumatic tubes interconnected in a network to transport carriers between a number of user stations. Various blowers and transfer units provide the force and path control means, respectively, for moving the carriers through pneumatic tubes and from tube-to-tube within the system. Transfer units allow pneumatic carries to be moved from a first pneumatic tube to a second pneumatic tube in order to route the pneumatic carrier between locations, or stations, in the system/network.

The pneumatic tubes that connect the various locations may be arranged in any manner that allows the carriers to be transferred between various stations. Generally, an individual station is interconnected to the network by a single pneumatic tube. In this arrangement, such a single pneumatic tube is utilized to carry carriers to and from the station. Other locations within the system may be interconnected with dedicated pneumatic tubes. That is, two locations within the system may be interconnected by two dedicated pneumatic tubes where a first tube carries outgoing pneumatic carriers and a second tube (e.g., a parallel tube) carries incoming pneumatic carriers.

More commonly, however, two locations are interconnected by a single pneumatic tube that can only carry a pneumatic carrier in a single direction at a time. That is, while a pneumatic tube is transporting a carrier, a route to an intended destination utilizing the pneumatic tube may not be immediately available for another carrier. Accordingly, it may be necessary or desirable to temporarily stop and store such a carrier until the carrier can be processed and sent to its intended destination.

In instances where a carrier is stopped within a pneumatic system between locations (e.g., between stations) and/or at a destination location, significant forces can be applied to the carrier. That is, some carrier stopping mechanisms include a stop element that is positioned into the bore of a pneumatic tube. A carrier passing through such a tube hits the stop element and comes to an immediate stop. Likewise, carriers arriving at user stations often hit an end stop with considerable force. In both instances, significant impact forces may be applied to the carrier and its contents.

SUMMARY

One objective of the presented inventions is to provide means for reliably arresting movement of a pneumatic carrier in a pneumatic tube carrier system without imparting significant impact forces to the carrier and its contents.

Another objective of the presented inventions is to provide means for temporarily storing one or more carriers within a pneumatic tube carrier system.

These and additional objectives are achieved by the presented inventions where pneumatic tube braking devices are operative to impede and/or stop a pneumatic carrier within a pneumatic carrier system. Such pneumatic tube braking devices utilize a variable bore that allows selectively constricting a passageway (e.g., bore) through which a carrier passes. The devices allows for gradually slowing and/or stopping a carrier thereby reducing impact forces applied to the carrier and its contents.

According to a first aspect, a pneumatic braking device is provided. The device includes a pneumatic tube having a sidewall that at least partially defines an internal bore, which extends between an inlet and an outlet. The internal bore has a first cross-dimension (e.g., diameter) that is sized to permit the passage of a carrier. The device further includes a deflectable sidewall portion that is selectively deflectable relative to the internal bore to establish a second cross-dimension at least at one axial location along a length of the pneumatic tube between the inlet and the outlet. This second cross dimension is generally less than the first cross-dimension, which allows the deflected portion to impede movement of a pneumatic carrier through the internal bore of the pneumatic tube. An actuator in operative communication with the deflectable sidewall portion is operative to displace at least a portion of the deflectable sidewall portion relative to internal bore of the pneumatic tube.

Variations and refinements exist to the subject aspect of the invention. Such variations and refinements may exist in any combination. For instance, the internal bore is typically has a circular cross-section and the internal cross-dimension is typically a diameter. However, any cross-section may be utilized that accommodate the passage of a correspondingly-shaped pneumatic carrier. In any arrangement, the cross-dimension of the bore may correspond to a minimum chord distance between two opposing points of the bore and the first and second cross-dimensions are typically measured along the same chord. Such opposing points may lie collinearly with each other and the center point of the bore.

The deflectable sidewall portion may be any element that is operative to move into and out of the internal bore of the pneumatic tube in order to at least partially engage a pneumatic carrier passing there through. For instance, the sidewall of the pneumatic tube may comprise a first portion and a second portion. The first portion may have a first thickness and the second portion may have a second thickness less than the first thickness. In this regard, the thinner second portion may define the deflectable sidewall portion that may be deflected by an actuator relative to the internal bore. Alternatively, the sidewall of the pneumatic tube may be elastically deformable allowing the sidewall to be partially compressed into its static bore (e.g., non-deflected bore). In another arrangement the deflectable sidewall portion may include a cantilevered tab, wherein the actuator displaces a portion of the cantilevered tab at least partially into the internal bore. The tab (e.g., a cantilevered element) may be defined by a cut or slit through the sidewall (e.g., a "U" shaped slit). In another arrangement, the deflectable member may be formed as a strip or spline defined by two adjacent slits or apertures formed through the sidewall. In one arrangement, a plurality of strips or splines defines the deflectable sidewall member. In such an arrangement, such splines may be evenly spaced about a periphery of the tube sidewall. These splines may be arranged such that they extend parallel to the axis of the bore or may be arranged in some other manner. The plurality of splines may allow for constricting the diameter of the tube about the entire periphery thereof.

The actuator of the first aspect may be any actuator that is operative to mechanically displace a portion of the sidewall directly or via a mechanical lineage. Such actuators may include linear actuators, stepper motors or any other like actuator known in the art. In one arrangement, the actuator includes an electric motor that engages a compression band to produce compression of the deflectable sidewall portion.

In another arrangement, the actuator may include a first actuator at a first axial location along the length of the pneumatic tube and a second actuator at a second axial location along the length of the pneumatic tube. Furthermore, the first and second actuators may be independently controlled. This may allow for multi-stage breaking with each actuator producing different amounts of deflection of the deflectable sidewall portion or different deflectable sidewall portions.

In other arrangements, the actuator may include, for example, a pressurized elastic protrusions (e.g., bladders), twistable elements operative to constrict the deflectable sidewall. For example, the deflectable sidewall portion may be defined by a thinned sidewall portion of an elastically deformable tube (e.g., polymeric tube). By way of example, this thinned or deflectable sidewall portion may be surrounded by a pressure jacket or bladder that is operative to increase pressure surrounding the sidewall portion with respect to the pressure within the pneumatic tube. As a result, an increased pressure may be generated exterior to the deflectable sidewall portion, causing the sidewall portion to deflect toward the center of the bore under the force generated by the increased pressure.

The first aspect may further include a pneumatic carrier identifier adjacent to the pneumatic tube that is operative identify a pneumatic carrier traveling through the deflectable sidewall portion. The pneumatic carrier identifier may be an RFID reader or an optical reader and may be in communication with a controller for controlling the actuator of the first aspect based on the pneumatic carrier identifier. The device may utilize an at least partially translucent tube to facilitate use of various reading devices (e.g., bar code readers, optical scanners etc.).

The first aspect may further include a connector at either or both ends of the tube. These connectors may facilitate interconnection of the brake to adjacent tubes in the pneumatic system. The connectors may be bands (e.g., pipe fittings), clamps, or other means of connecting the brake to pneumatic tubing.

In another aspect, a method is provided for slowing a pneumatic carrier passing through a bore of a pneumatic tube within a pneumatic carrier system. The method includes deflecting a first section of a sidewall of a pneumatic tube, relative to the internal bore of the tube, from a first cross dimension to a deflected second cross dimension where the second cross dimension is less than the first cross dimension. Further, the method may include contacting the pneumatic carrier passing through the tube with at least a portion of the deflected first section such that the contacting causes the pneumatic carrier to slow to a second speed less than the first speed. Such sidewall deflection may allow for applying braking forces and/or stopping forces to the wear band(s) of a pneumatic carrier.

Variations and refinements exist to the subject aspect of the invention. Such variations and refinements may exist in any combination. For instance, the method may include deflecting a second section of the sidewall of the pneumatic tube relative to the bore. Furthermore, the method may include contacting the pneumatic carrier with at least a portion of the second section such that the contacting causes the pneumatic carrier to further slow or stop.

In any case, the deflectable member is operative to impede and/or stop passage of a pneumatic carrier through the internal bore of the pneumatic tube when deflected into the static bore of the tube, which is sized to permit transit of a pneumatic carrier there through. Further, by utilizing multiple deflectable sidewall portions over the length of a pneumatic tube, the deceleration profile of a carrier may be controlled. For instance, a first section of the sidewall may be deflected to provide an initial arresting of the carrier (e.g., slow the carrier from a first speed to a second slower speed). Likewise additional sidewall sections may be deflected to further slow the carrier. In one arrangement, the deflection of the sidewall section(s) may be based on the weight and/or velocity of the carrier. Further, the speed of the carrier may be monitored (e.g., using RFID devices) to dynamically adjust the sidewall deflection.

BRIEF DESCRIPTION OF THE DRAWINGS

FIGS. 5A-E illustrate the brake device arresting the movement of a pneumatic carrier.

DETAILED DESCRIPTION

Reference will now be made to the accompanying drawings, which at least assist in illustrating the various pertinent features of the present invention. In this regard, the following description of a pneumatic brake device utilizing a variable diameter bore is presented for purposes of illustration and description. Furthermore, the description is not intended to limit the invention to the form disclosed herein. Consequently, variations and modifications commensurate with the following teachings, and skill and knowledge of the relevant art, are within the scope of the present invention. The embodiments described herein are further intended to explain the best modes known of practicing the invention and to enable others skilled in the art to utilize the invention in such, or other embodiments and with various modifications required by the particular application(s) or use(s) of the present invention.

Pneumatic Carrier System Overview

Figure 1:
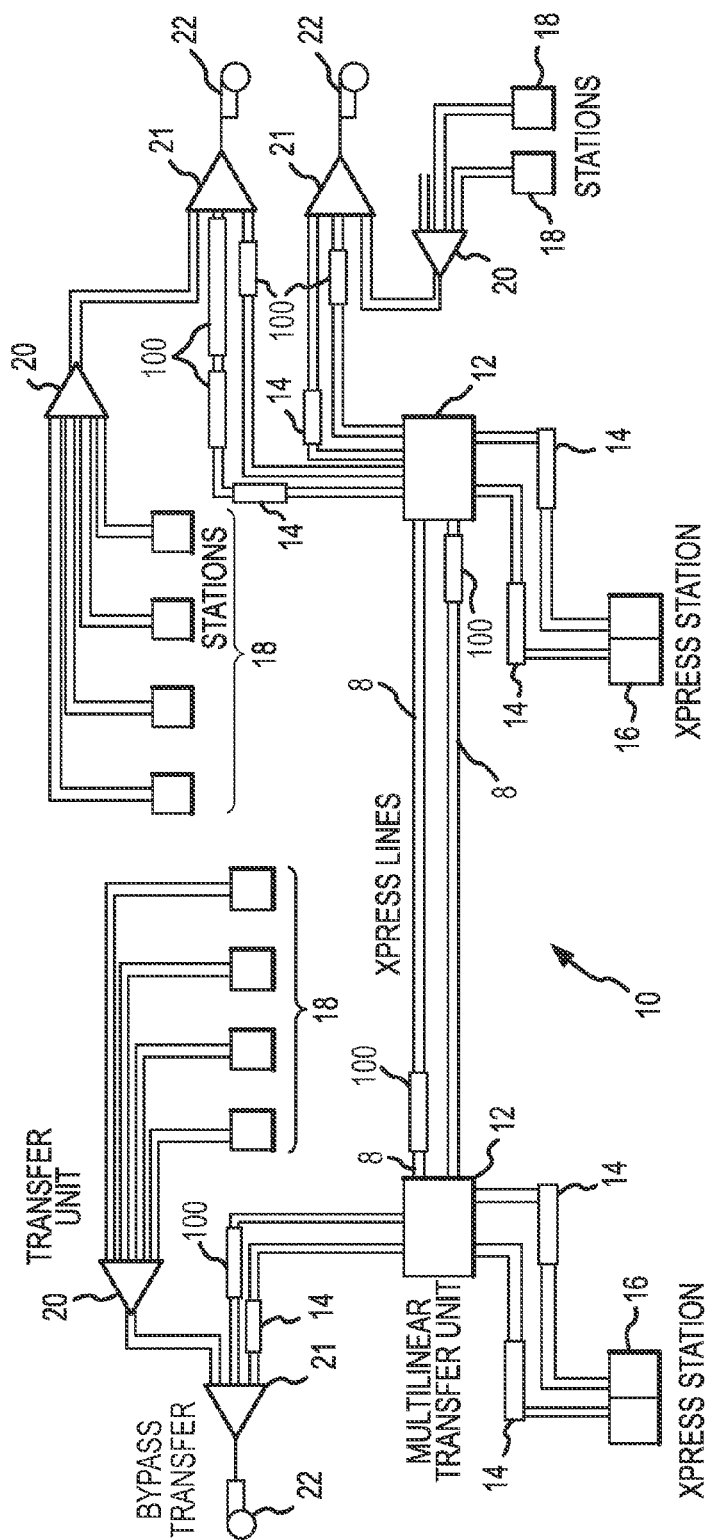
FIG. 1 illustrates a mechanical diagram for the pneumatic carrier system.

FIG. 1 illustrates a system diagram for an exemplary pneumatic carrier system 10 within which the braking devices described herein are employable. In general, the pneumatic carrier system 10 transports pneumatic carriers between various user stations 16, 18, each such transport operation being referred to herein as a "transaction." At each of the user stations 16, 18, a user may insert a carrier, select/enter a destination address/identification and a transaction priority, and then send the carrier. The system determines an optimum path to route the carrier and begins directing the carrier through the system.

Interconnected with each station 16, 18 is a transfer unit 20 which orders carriers arriving through different tubes from a different station 16, 18 into a single pneumatic tube. This pneumatic tube is further in connection with a vacuum bypass transfer unit 21 (i.e., a turnaround transfer unit) and a blower 22 that provides the driving pneumatic force for carrier movement. A set of transfer units 20, 21, a blower 22 and one or more stations 16, 18 typically define a single zone. Generally, the blower 22 of each zone is operative to create pressure and/or vacuum (i.e., system pressure) within the pneumatic tube(s) of that zone. This pressure/vacuum is operative to create a pressure differential across a carrier disposed within the pneumatic tubes and causes the carrier to move through the pneumatic tubes. That is, the blower 22, transfer units and pneumatic tubes create a pneumatic circuit for use in transporting carriers between first and second points within the system 10. Multiple different zones may be interconnected (e.g., using a multi-linear transfer unit 12) to collectively define the pneumatic carrier system 10.

Within the system 10 itself, one or more devices are employable for ordering and routing carriers to their selected destinations. One type of device is a traffic control unit (TCU) 14 which is employable to receive, temporarily store and release a number of carriers. This functionality allows for launching a carrier from a user station 16, 18 prior to a path for a destination location being established. Likewise, this allows carrier tubes interconnecting the user station 16, 18 to be cleared for incoming traffic.

Also included in the system 10 are multi-linear transfer units (MTUs) 12 which have functionality to direct carriers from one pneumatic tube to another pneumatic tube (e.g., between tubes in single zone or between different zones). For example, a MTU 12 may receive a carrier released by a TCU 14 in a first pneumatic tube and direct the carrier into a second pneumatic tube in the system 10 to complete a given transaction.

Figure 2:
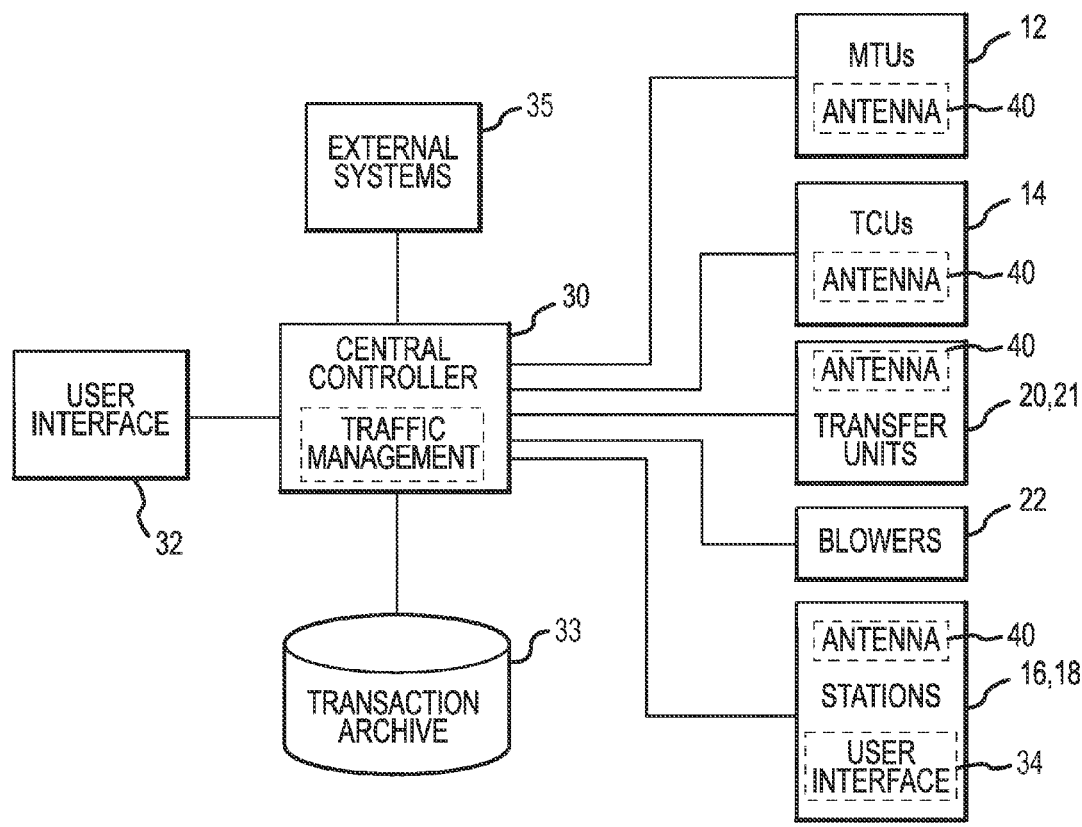
FIG. 2 illustrates a system diagram for the operation and monitoring of the pneumatic carrier system.

All of the components described in FIG. 1 are electronically connected to a system central controller (SCC) 30 that controls their operation and which is disclosed in the electrical system diagram of FIG. 2. The system central controller (SCC) 30 provides centralized control for the entire pneumatic carrier system 10 and may include a digital processor and memory/achieve 34. In addition to controlling the operation of the carrier system 10 as depicted in FIG. 1, the SCC 30 may provide additional functionality. Such functionality may include, without limitation, interconnection to external systems 35 and/or use of multiple antennas or readers 40 (e.g., optical readers, radio frequency identification readers, etc.) that may allow for identification of carriers within the system 10. In the latter regard, a system for RFID identification within a pneumatic carrier system is described in U.S. Pat. No. 7,243,002 entitled "System and Method for Carrier Identification in a Pneumatic Carrier System" having an issue date of Jul. 10, 2007, the contents of which are incorporated by reference herein.

Connectable to the SCC 30 may be one or more user interfaces 32 through which a system user may monitor the operations of the system and/or manually enter one or more commands to control its operation. Typically, at least one user interface 32 is located at or within an area serviced by stations 16, 18. For example, in a medical facility application, one or more user stations 16, 18 and at least one user interface 32 may be provided within each emergency room, laboratory, nursing station, etc. In this regard, the user interface may be contained in the stations 16, 18, or be stand-alone units. Components 12, 14, 16, 18, 20, 21 and 22 shown in FIG. 2 are representations of the various electrical and electro-mechanical systems that may be employed by the pneumatic carrier system 10. Although in FIG. 2 they are represented single blocks, one skilled in the art will realize that the block for each type of device represents the electronics for a number of the same or similar type of components positioned throughout the system which provides for its operation.

Figure 3:
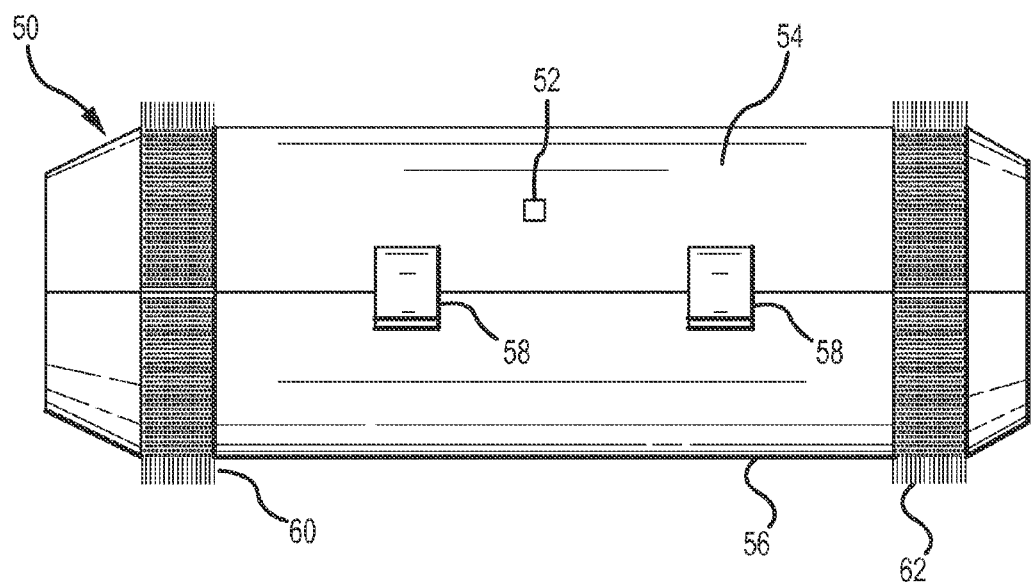
FIG. 3 illustrates a view of the pneumatic carrier including an identification chip.

One type of carrier 50 that may be utilized with the system 10 is illustrated in FIG. 3 and includes first and second shell members 54 and 56 that collectively define an enclosed space for use in carrying materials as they are transported through the system 10. These shell members 54, 56 are adjoinably cylindrical in cross-section for use in correspondingly cylindrical pneumatic tubes of the system 10. The shell members 54 and 56 may be pivotably interconnected by a hinge member (not shown), and latches 58 may be provided for securing the first shell member to the second shell member in a closed configuration. Also included as part of the carrier 50 are wear bands 60, 62. The wear bands 60, 62 are sized to snuggly fit within the inside surface of the pneumatic tubes in order to substantially block the passage of air across a carrier 50 within such a pneumatic tube. Accordingly, this blockage results in a pressure differential across the carrier 50 that results in the carrier 50 being pushed or drawn through the pneumatic tube. In the illustrated embodiment, an ID chip 52 is attached to one of the shell members 54. In this regard, antenna device/readers may be incorporated into pneumatic tubes within the system 10 to monitor the location and/or translocation of the carrier through the system.

Pneumatic Tube Brake

A problem particular to conventional pneumatic tube systems is the shape of the deceleration profile when stopping a carrier. Most conventional systems bring a moving carrier to rest by (a) inserting a finger, dog or pal into the direction of carrier travel, or (b) creating a closed chamber whereby the moving carrier creates a positive pressure ahead of itself with a "bicycle pump" effect. Deceleration forces under these conditions can exceed 30-50 g's, potentially harming the carrier, the payload and requiring the supporting equipment to be large to survive repeated impacts and jerks.

In the baking devices presented herein, the diameter of a pneumatic tube or pipe can be changed in one or more locations perpendicular to the carrier travel path. In this regard, a plurality of actuators or force generators may be positioned along the length of the tube to selectively alter (e.g., deflect) the inside cross-dimension of the tube. Each actuator may create a slightly different tube cross-dimension (e.g. diameter) allowing the inside surface of the deflected tube to contact the wear bands of a carrier passing though the tube. By using two or more deflected locations along the length of a tube a gradual braking or slowing of the carrier may be achieved reducing the deceleration forces applied to the carrier and its contents. This allows the deceleration profile to be shaped and manipulated. This is a valuable feature, enabling the system to dynamically adapt its braking characteristics in response to carrier weight, payload sensitivity, or any combination thereof.

When placed under computer control in sufficiently long transport tubes, the braking system described can move a carrier peristolically, allowing the system to move other transactions at high or very high speeds, while allowing other carriers within the brakes domain to move limited distances at the same time and within the same blower cycle.

FIG. 1 illustrates one system embodiment where an in-line deflectable brake device 100 is used in conjunction with high speed express lines. However, it will be appreciated that the in-line brake may be utilized another system locations. In any application, the tube brake device 100 is operative to slow or stop a carrier traveling within a tube by altering the dimension of the tube to at least partially contact a carrier passing through the tube.

Figure 4A:
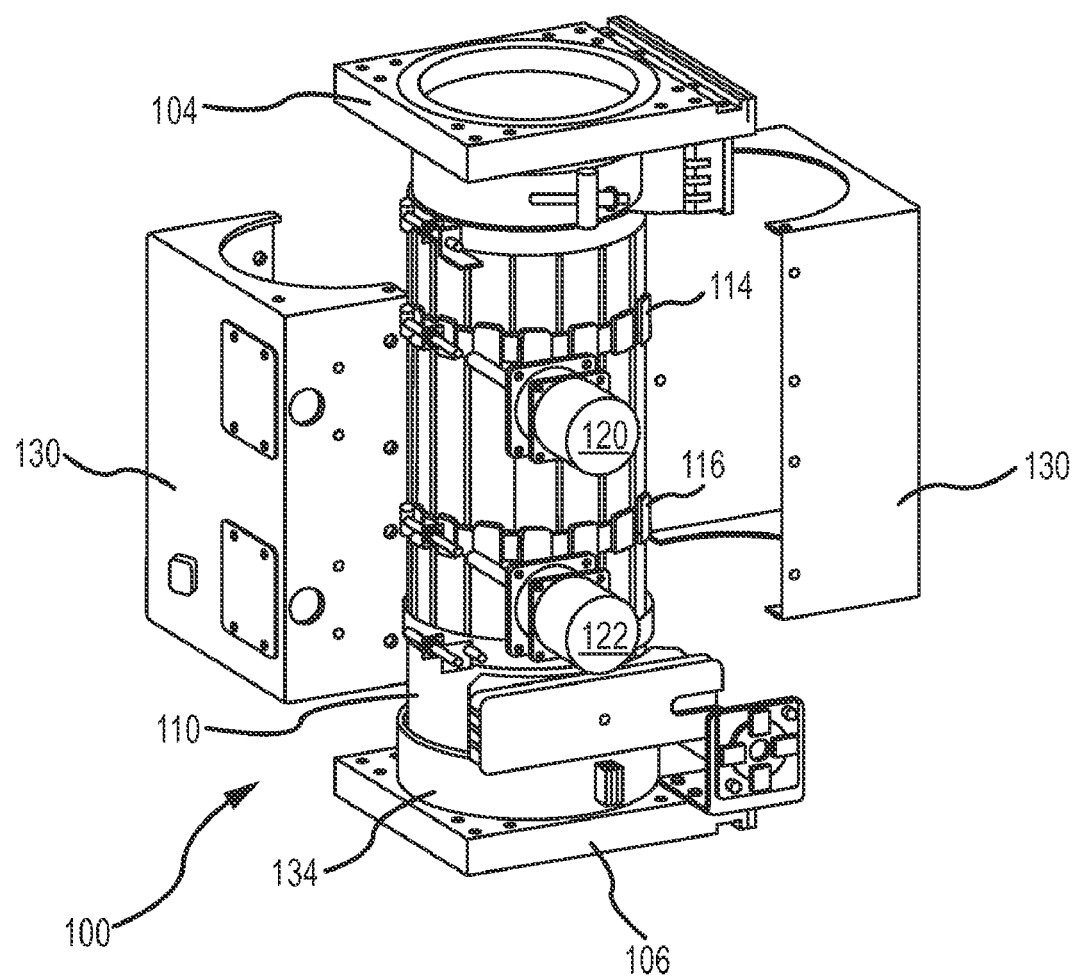
FIGS. 4A-C illustrates perspective views of one embodiment of a variable diameter pneumatic tube brake device.
Figures 11A, 11B:
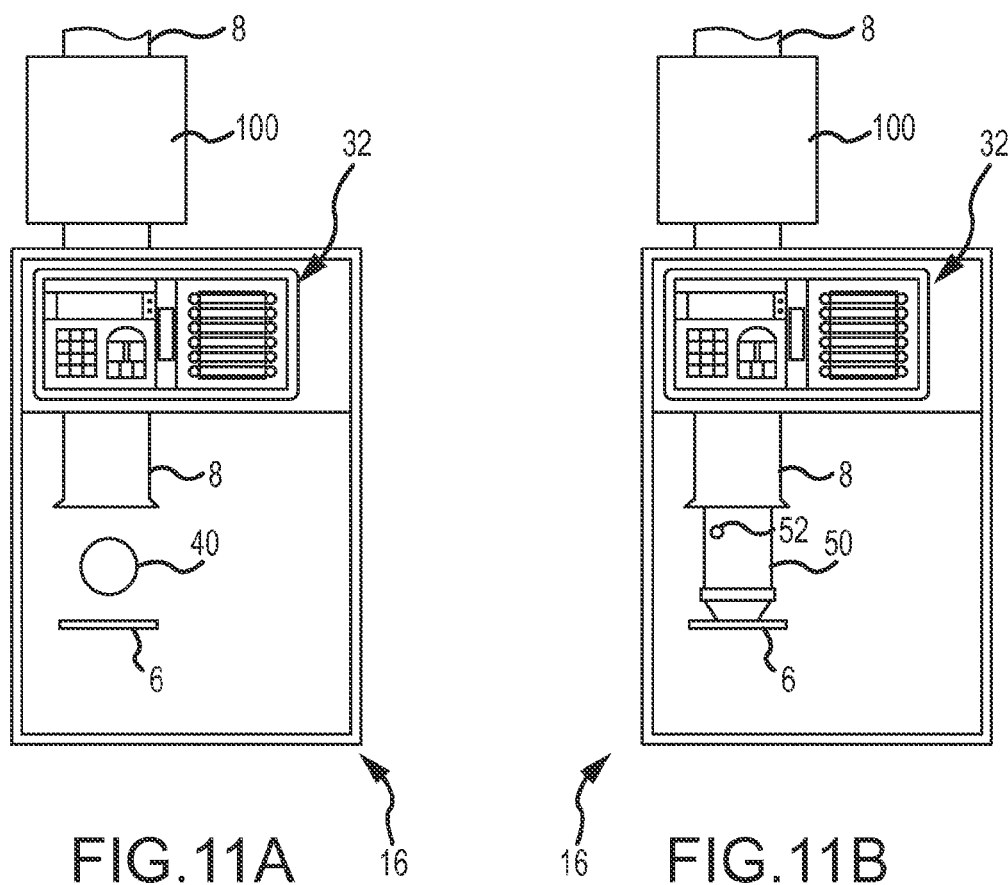
FIGS. 11A and 11B illustrate a carrier station utilizing a variable diameter air brake.

FIG. 4A shows a partially exploded perspective view of one exemplary pneumatic tube brake device that is operative to impede and/or stop the passage of a pneumatic carrier passing through a pneumatic tube within the system 10. As shown in FIGS. 1 and 6, the pneumatic tube brake device 100 may be interconnected in-line between first and second pneumatic tubes 8a, 8b within the system 10. In such an arrangement, the internal bore of the pneumatic tube brake is aligned with the internal bores of the first and second pneumatic tubes 8a, 8b through which the pneumatic carrier 50 may be transported. Alternatively, the pneumatic tube brake device 100 may be positioned proximate to the inlet tube 70 leading into a user station as illustrated in FIGS. 11A and 11B.

In any application, the pneumatic tube brake device 100 is operative to arrest the movement of a pneumatic carrier as it passes through a tube of the pneumatic system. More importantly, the pneumatic tube brake device 100 is selectively operative to partially or fully arrest the movement of a carrier over a distance such that impact forces applied to the carrier are reduced. In the present embodiment, the pneumatic tube brake device 100 utilizes a variable diameter pneumatic tube 110 that may be selectively constricted by first and second constraint bands 114, 116 (controlled by first and second actuators 120, 122) to reduce the inside diameter of the internal bore 102 of the pneumatic tube brake device 100. See FIGS. 4A-4C. This reduced diameter allows for engaging the wear bands of a carrier passing through the variable diameter pneumatic tube and thereby applying a braking force to the carrier.

As shown in FIGS. 5A-5E, the actuators 120, 122 are operative to apply a compressive forces to separate locations of the pneumatic tube 110 of the brake device 100 in order to deflect a sidewall portion of the tube 110 inward (e.g., relative to the internal bore). For instance, as shown in FIG. 5A, the first and second actuators 120, 122 may apply a first force at a first location and a second force at a second location along the length of the tube 110. As shown, the upper actuator 120 may be operated to apply a smaller deflection force to the variable diameter tube 110. In contrast, the lower actuator 122 may be operated to apply a greater deflection force, which results in a greater inward deflection of the sidewall of the variable diameter tube 110.

By controlling the amount of deflection of the sidewall portions inwardly into the static internal bore of the variable diameter tube 110, a partial or full braking action may be applied to the wear bands of the pneumatic carrier 50 passing through the pneumatic tube brake 100. For instance, as shown in FIG. 5B, as a carrier 50 approaches the first inwardly deflected section of the pneumatic tube brake 100 (i.e., caused by the first actuator 120), the first wear band 60 of the carrier 50 is compressed. However, as long as the deflection at the first section is not great enough to stop the movement of the carrier 50, the carrier may continue passage through the variable diameter tube as shown in FIG. 5C. While not stopping the carrier 50, it will be appreciated that by reducing the diameter of the tube 110 kinetic energy may be removed from the moving carrier 50 thereby slowing the carrier. Further, reduction of the tube diameter typically results in application of braking forces to the pliable wear bands 60, 62 of the carrier 50. This may reduce the forces applied to the, generally rigid carrier and any contents within the carrier.

Figure 4B:
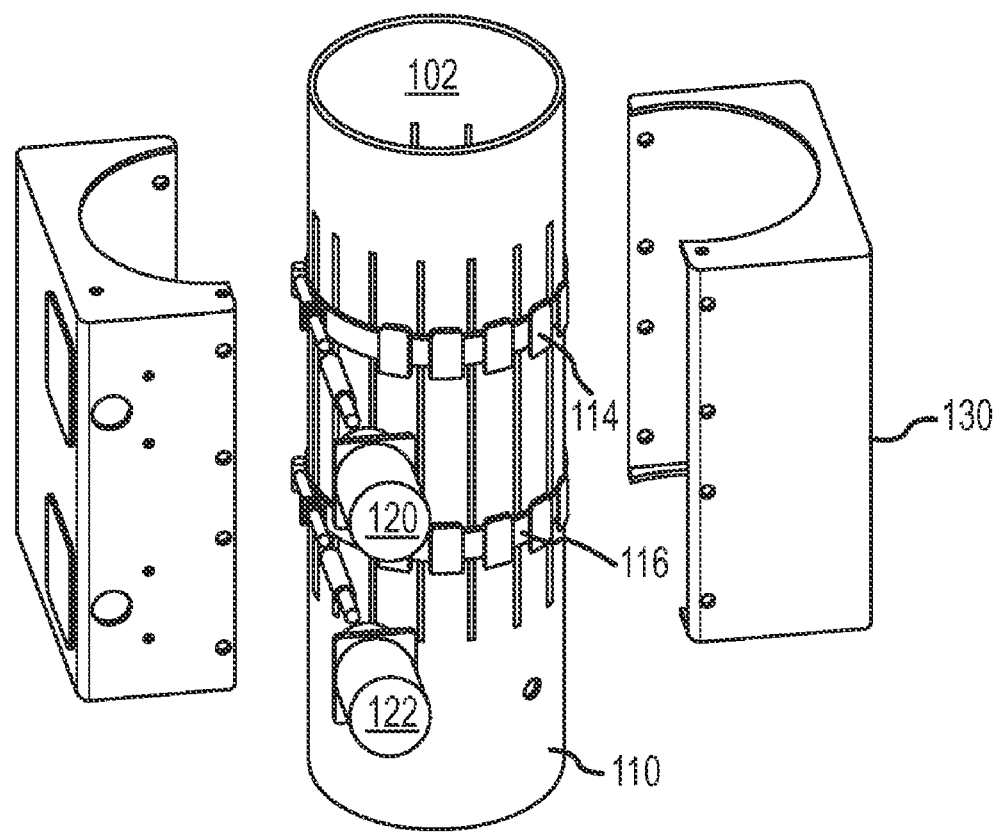
Figure 4C:
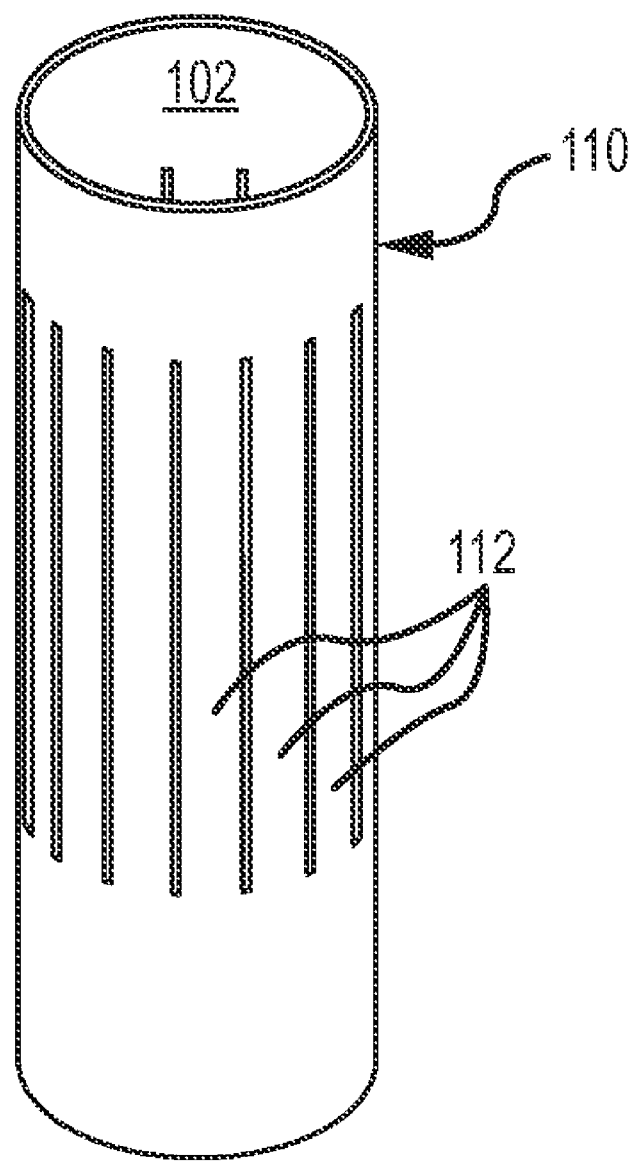

In the present embodiment, variation of the diameter of the tube 110 may accomplished by forming a plurality of individual strips (e.g., splines) 112 into the sidewall of the tube 110. As illustrated in FIG. 4C, these splines 112 are formed into the tube 110 using a plurality of axial slits (e.g. cuts or apertures) formed along a portion of the length of the tube. While shown in FIG. 4C as a plurality of axial cuts, it will be appreciated that other arrangements are possible and considered within the scope of the present invention. By way of example, the cuts may extend axially and radially such that a candy stripe pattern is created in the sidewall defining a plurality of twisting splines.

In any arrangement, each individual spline may be partially displaced relative to the non-deflected (e.g. static) internal bore 102 of the device 100. In the present arrangement, the actuators 120, 122 are operative to equally deflect all of the splines 112 relative the static internal bore. In this regard, the compression bands 114, 116 are disposed around the outside perimeter of the tube 110. See FIG. 4B. These compression bands 114, 116 are interconnected to the actuators 120, 122, which are operative to tighten and loosen the bands. In one embodiment, stepper motors are utilized as the actuators 120, 122. Such stepper motors provide highly controlled deflection of the splines into the internal bore 102 of the tube 110.

In the current embodiment, conventional rotary electric motors (e.g., stepper motors) drive screws or other mechanical elements that apply a force typically perpendicular to carrier motion (i.e., the central axis of the bore). These forces deflect the sidewall or a deflectable portion of the sidewall into the carrier path. However, any coupling between the sidewall and an actuator/prime mover may provide the same or similar function. A whiffletree (or plurality thereof) may allow application of various degrees of force along the tube length, effectively dividing the output of a single prime mover (or plurality thereof) into variable forces along the length of the brake. The use of different linkages may also provide one or more degrees of separation between the sidewall and a prime mover to provide the same effect. The prime movers could be any of these typically used as actuators; rotary motors, linear motors, pneumatic actuators, magnetic field. Any means for creating a controlled, directed force, e.g., radial cams, sliding wedges, solenoids, pneumatic actuators, etc., would apply and is considered within the scope of the present disclosure.

The ability of the braking device 100 to reduce the internal diameter of the tube to engage the wear bands of a carrier passing through the tube also allows for a multiple stage braking. As shown in FIG. 5D, after passing through the first reduced diameter section caused by the first actuator 120 and compression band, the first wear band 60 of the carrier may engage the second inwardly deflected section caused by the second actuator 122 and the second compression band. In the present embodiment, the second actuator may apply a greater deflection force to the tube 110 to further apply a greater braking force to the carrier 50. Even if the first wear band 60 passes though the second reduced diameter/inwardly deflected section of the tube 110, the second wear band 62 may then engage the first reduced diameter inwardly deflected section as shown in FIG. 5E. Accordingly, in the present embodiment, first and second stages of braking may be applied to the first wear band 60 by the first and second reduced diameter sections of the tube 110. Additionally, a third and fourth braking stage may be applied to the second wear band 62 of the carrier 50. It will be appreciated that, based on the deflection of the first and second sections of the variable diameter tube, the carrier may be brought to a stop before all the braking stages are applied. For instance, the device 100 may be utilized to apply first stage braking using the first reduced diameter section and halt the carrier using the second stage braking. See for example, FIG. 5D. However, this is not a requirement.

It will be further appreciated that additional actuators or fewer actuators may be utilized. For instance, a device including a single actuator may be operative to apply first and second stage braking to the first and second wear bands of a carrier. In further embodiments, additional braking devices may be placed along a pneumatic tube. This may allow for providing additional braking stages at different locations along travel path of a carrier. In this regard, such braking devices may be utilized to controllably decelerate a carrier to reduce forces applied to the carrier and its contents. That is, a deceleration profile may be provided for a carrier to substantially reduce or eliminate impact forces applied to the carrier.

To allow for in-line connection between first and second pneumatic tubes, the device utilizes a pressure jacket 130. As best shown in FIGS. 4A, and 4B, shell members that mate around the outside of the tube 110 and which extend from a location above the splines 112 to a location below the splines 112 form the pressure jacket. The pressure jacket forms a housing that reduces or eliminates air loss through the cuts or apertures in the tube 110. The pressure jacket 130 may be connected to the outside surface of the tube 110 utilizing any appropriate means. For instance, clamps, adhesives and/or various sealants may be utilized. What is important is that the pressure jacket 130 prevents significant leakage of air through the device 100 though it will be appreciated that the pressure jacket need not be airtight.

As shown in FIG. 4A, the present embodiment of the device further includes first and second end plates 104, 106 that are interconnected to the first and second ends of the variable diameter tube 110. These end plates 104, 106 may be interconnected to adjacent pneumatic tubes and/or user stations. Furthermore, it will be appreciated that the surfaces of these end plates may be recessed to accommodate one or more seals or gaskets. In other embodiments, the first and second ends of the tube 110 may form pipe stubs which may be connected to interfacing pipes using standard piping couplers.

In one embodiment, the variable diameter tube 110 is formed from a nonmetallic element. For instance, the tube may be formed of a clear polycarbonate or other polymeric material to allow, for example, reading of bar codes or other identification devices through the tube. In such an arrangement, the tube may be at least partially translucent. However, it will be appreciated that the tube may be opaque if the reading device is formed of a RFID device. Such an RFID reader device/band 134 is illustrated in FIG. 4A. Preferably, such a band or other reading device may be positioned along the length of the tube 110 to ensure that an identification element of a carrier may be read while the carrier is passing through the pneumatic tube brake 100 and/or is held stationary by the pneumatic tube brake 100. In other embodiments steels (e.g. spring steels, etc.) may be utilized to form the variable diameter tube 110.

It may be desirable that the material selected for the variable diameter tube be elastically deformable. This allows for deflecting of a portion of the sidewall from a static position to a deflected position where the deflected sidewall portion protrudes into the static (i.e., non-deflected) internal bore of the tube in response to an applied force. Upon releasing the applied force, the elastically deformable material may relax from the deflected position to a static position. However, other materials may be utilized. Further, other embodiments may utilize a positive displacement device that deflects and retracts a portion of the sidewall (or other element) into and out of the static bore of the tube.

It may be further desirable that the length of the axial cuts in the tube 110 that define the splines be less than the distance between wear bands 60, 62 of a carrier 50 utilized with the pneumatic system. This is may prevent air from bypassing around a stationary carrier through the cuts and thereby facilitate the re-initiation of carrier movement upon the actuator(s) releasing the splines. That is, upon releasing the actuators the sidewall may relax to an undeflected state and the air pressure within the system may reinitiate movement of the carrier.

Though discussed above, where the entire circumference of the tube varies in diameter, alternative embodiments are hereby contemplated that incorporate alterative deflectable sidewall portions. In any embodiment, the actuator deflects an element relative to the bore and thereby reduces the cross dimension of the bore relative to the cross dimension of the pneumatic tube through which the carrier passes unrestricted. Cross dimension may be defined by the minimum chord length between two opposing points of the bore connected by a reference line that also passes through the center point of the cross section of the bore. To illustrate the concept of the cross dimension, FIG. 6B-D depicts several embodiments of the cross section of the deflectable sidewall portion in a deflected state.

Figure 6A:
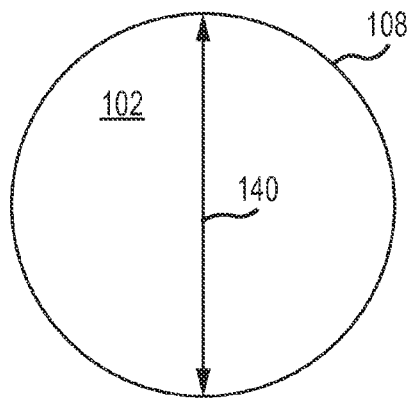
FIGS. 6A-D illustrate various embodiments of a cross sectional area of a variable cross-dimension pneumatic tube.
Figure 6B:
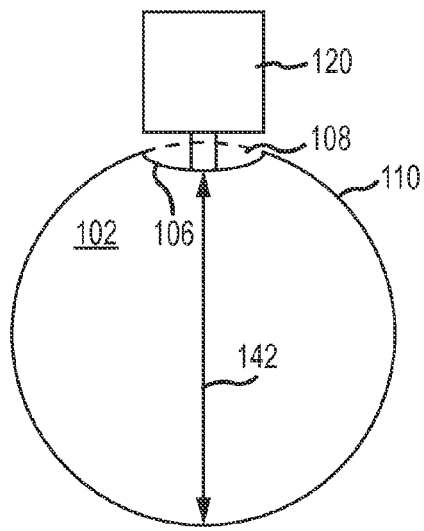

FIG. 6A is a depiction of the cross section of a pneumatic tube 110 where the sidewall 108 is undeflected and through which the pneumatic carrier is free to pass. The undeflected sidewall defines a cross dimension 140 that corresponds to the static diameter of the pneumatic tube 110. The undeflected sidewall 108 further establishes a static bore through which a carrier freely passes. Turning to FIG. 6B, the sidewall 108 has been partially deflected by an actuator 120 that pushes a portion of the sidewall into the static bore of the tube to define a deflected sidewall portion 106. In FIG. 6B, a cross dimension 142 is shown between the deflected portion 106 and the opposite section of the sidewall 110. In this regard, the cross-dimension 142 of the deflected tube is less than the cross-dimension 140 of the undeflected tube 110. The actuator 120 may be a linear actuator that may also include a plunger that is operative to impinge on the sidewall 1.10 to produce the deflected portion 106 of the sidewall.

Figure 6C:
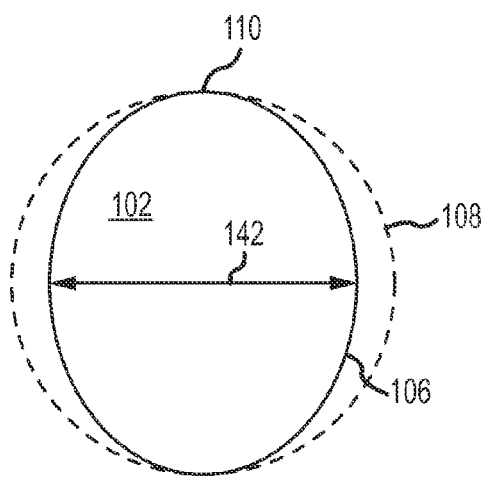
Figure 6D:
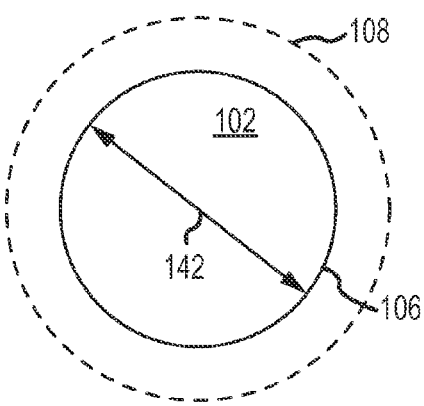

With similar reference to FIG. 6C, a deflected portion 106 is shown. Again the pneumatic tube sidewall 108 is represented by a broken line and shows the predeflected state of the deflected sidewall 106. A cross dimension 142 is established as the minimum chord distance passing through the center of the bore 102. As can be appreciated the bore 802 in FIG. 6C has a smaller cross sectional area than the bore 102 in FIG. 6A. Turning to FIG. 6D, an embodiment is shown wherein the deflected sidewall portion 106 is deflected such that the deflected sidewall portion 106 is circular. Again, the pneumatic tube sidewall 108 is shown in broken line for comparison with regard to the deflected sidewall portion 102. The deflected sidewall portion 106 establishes a cross dimension 142. It will be appreciated that in this regard, where the deflected sidewall portion 106 forms a circular cross section, the cross dimension 142 corresponds with the diameter of the deflected portion (not to scale). Also, the deflected bore 102 of FIG. 6D is less than the undeflected bore 102 as depicted in FIG. 6A.

Figure 7:
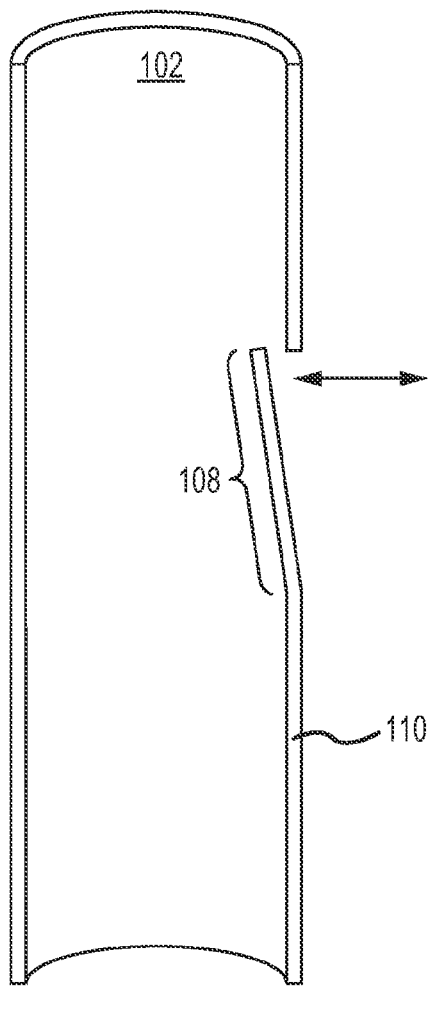
FIG. 7 illustrates cross sectional view taken along the length of a pneumatic tube showing one embodiment of a deflectable sidewall portion according to one aspect of the present invention.
Figure 8:
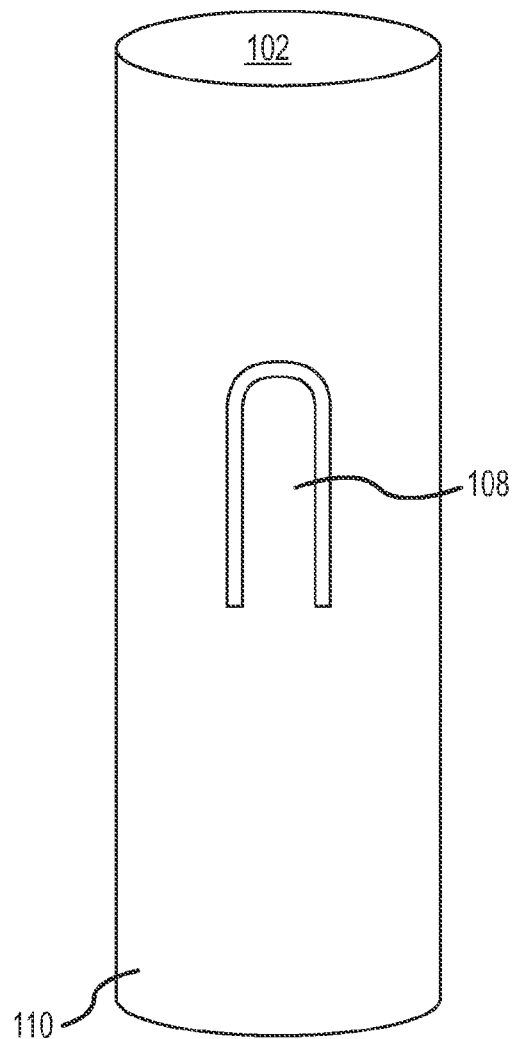
FIG. 8 is a perspective view of the embodiment of FIG. 7.
Figure 9:
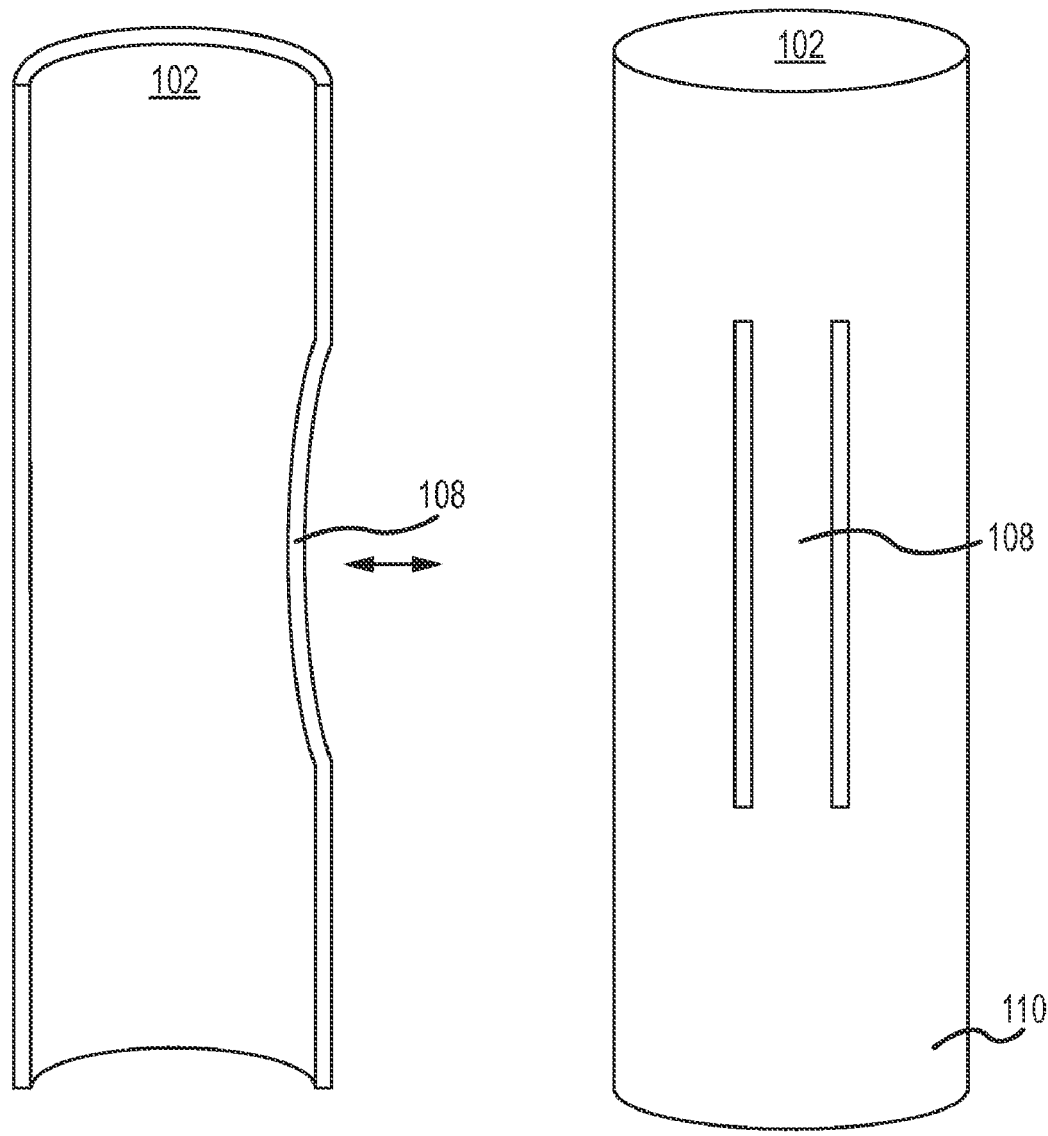
FIG. 9 illustrates cross-sectional and perspective views of another embodiment of a variable diameter tube.

FIGS. 7 and 8 depicts another embodiment of a tube where an internal cross-dimension may be varied for braking purposes. As shown, the internal bore 102 of the tube is such that it accommodates the passage of a pneumatic carrier there through. Again, the sidewall 110 includes a selectively deflectable sidewall portion 108 that is at least partially deflectable into the internal bore 102. As depicted in FIGS. 7 and 8, the deflectable sidewall portion 108 may be a cantilevered tab. While in FIG. 8, the tab is depicted as a "U" shaped cut or aperture in the sidewall 110, it is to be understood that the tab may be formed by other means and take other shapes other than the "U" shaped tab depicted. Alternately, the deflectable sidewall portion may be defined as a single spline defined between two adjacent cuts in or though the sidewall as shown in FIG. 9. In either case the actuator may deflect a portion of the sidewall 108 proximate to the cut or apertures relative to the internal bore 102 of the sidewall 110.

The tab or spline may be in communication with an actuator (not shown) that is operative to deflect the deflectable element at least partially into the bore. The actuator may be of any kind that is operative to produce relative motion of the deflectable element with respect to the remainder of the sidewall such that the element at least partially intrudes into the internal bore. In this regard, the actuator may be a linear actuator, such as a hydraulic cylinder, pneumatic cylinder, electrical solenoid, or other known linear actuator capable of producing linear movement. Alternatively, the actuator may include an electric motor, a radial or linear cam, sliding wedges, or the like. Moreover, while a single tab and spleen are shown in FIGS. 8 and 9, additional deflectable elements may be provided as well. This may include elements at the same or different axial location and/or in the radial direction from, the illustrated elements.

In one arrangement, the pneumatic tube brake 100 may be utilized as a traffic control unit. In this regard, the pneumatic tube brake may be disposed within a pneumatic system in order to temporarily hold one or more carriers at predetermined locations within the system. Furthermore, it will be appreciated that a plurality of such pneumatic tube brakes may be stacked end-to-end to store a corresponding plurality of carriers in-line in a pneumatic tube. However, in order to utilize the pneumatic tube brake 100 as a TCU, it may be necessary to duct air around the device when a carrier is being held by the device. That is, a stationary carrier within the pneumatic tube brake 100 results in a near complete blockage of a pneumatic tube line affecting operation of downstream components.

Figure 10:
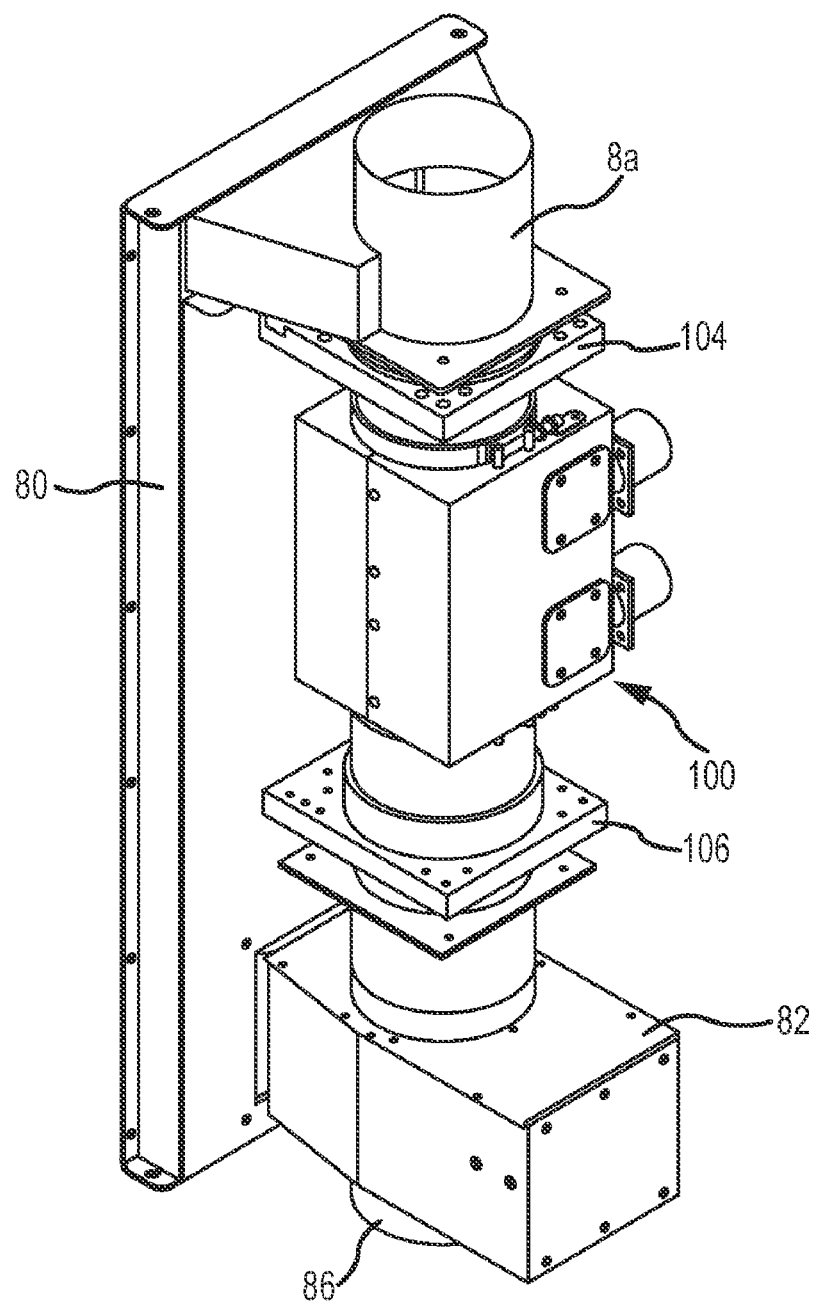
FIG. 10 illustrates a perspective view of one embodiment of a pneumatic tube with a deflectable sidewall portion.

As shown in FIG. 10, the pneumatic tube brake is disposed in-line between first and second pneumatic tubes 8a, 8b. To permit fluid flow around the device 100 to permit operation of downstream system component, a by-pass duct 80 is utilized. As show, the by-pass dust 80 is fluidly interconnected to the first and second tubes 8a, 8b at locations above and below the plates 104, 106 of the pneumatic tube brake 100. At least one end of the by-pass duct includes a valve 82 that allows for selective opening and closing airflow through the by-pass duct. That is, the valve 82 may be opened when the pneumatic tube brake 100 holds a carrier permitting airflow to continue around the carrier.

As illustrated in FIGS. 11A and 11B, the pneumatic tube brake 100 may also be utilized proximate to a user station 16. In this regard, the pneumatic tube brake 100 may be utilized to provide braking for incoming carriers. That is, instead of carriers entering the station and dropping into a bin or hitting an end-stop 6, the pneumatic tube brake 100 may slow or stop the carrier prior to the carrier entering the station 16 to reduce input forces applied to the carrier. For instance, a carrier may be slowed or stopped (e.g., utilizing two or more braking stages) above the station 16. The pneumatic tube brake 100 may then release the carrier which may fall into the receiving mechanism of the station 16. It will be appreciated that such braking may reduce the velocity of the carrier entering the station and thereby reduce impact forces applied to the carrier and its content when the carrier contact an end stop of the station In another arrangement, the pneumatic tube brake 100 may be utilized in high speed and/or long distance pneumatic transfer applications. In such applications, pneumatic carriers may be accelerated to high speeds to quickly transport time sensitive contents. Reducing the speed of such carriers has heretofore been problematic. However, the pneumatic tube brake 100 of the present inventor allows for bleeding off kinetic energy of such high speed carriers near their destination locations. For example, in FIG. 1 one or more pneumatic tube brake's 100 may be incorporated into the express lines. Accordingly, the carriers may be sent at increased velocities through such lines with the assurance that one or more in-line pneumatic tube brake's will reduce the speed of the carrier prior to its arrival at a destination location where it must come to a complete stop. That is, braking may be speed over a distance thereby reducing the magnitude of the impact applied to the carrier and its contents.

The foregoing description of the design has been presented for purposes of illustration and description. Furthermore, the description is not intended to limit the inventions to the forms disclosed herein. Consequently, variations and modifications commensurate with the above teachings, and skill and knowledge of the relevant art, are within the scope of these inventions. For instance, it will be appreciated that a pneumatic tube of a braking device may have multiple separate deflectable sidewall portions and that the length of such tubes may be varied. The embodiments described hereinabove are further intended to explain best modes known of practicing the invention and to enable others skilled in the art to utilize the invention in such or other embodiments and with various modifications required by the particular application(s) or use(s) of the invention. It is intended that the appended claims be construed to include alternative embodiments to the extent permitted by the prior art.

What is claimed is:

1. A brake for use in a pneumatic tube carrier system, comprising:
   a pneumatic tube having a sidewall that at least partially defines an internal bore extending between an inlet and an outlet, wherein said internal bore has a first cross dimension sized to accommodate the passage of a pneumatic carrier there through;
   a deflectable sidewall portion of said pneumatic tube, wherein said deflectable sidewall portion is selectively deflectable relative to the internal bore to establish a second cross dimension at least at one axial location along a length of the pneumatic tube between the inlet and the outlet, wherein the second cross dimension is less than the first cross dimension; and
   an actuator in operative communication with the deflectable sidewall portion via a compression band disposed around the pneumatic tube, wherein the actuator is operative to constrict the compression band to displace at least a portion of the deflectable sidewall portion relative to internal bore of the pneumatic tube.

2. The apparatus of claim 1, wherein said actuator is operative to displace the deflectable portion from a first position associated with said first cross dimension to a second position associated with said second cross dimension.

3. The apparatus of claim 1, wherein the first cross dimension is a static diameter of the pneumatic tube and the second cross dimension is a deflected diameter of the pneumatic tube.

4. The apparatus of claim 1, wherein the pneumatic tube comprises a first portion and a second portion, the first portion having a first thickness and the second portion having a second thickness less than the first thickness, where the second portion defines the deflectable sidewall portion.

5. The apparatus of claim 1, wherein the deflectable sidewall portion includes an aperture extending through the sidewall, wherein the actuator deflects a portion of the sidewall proximate to the aperture.

6. The apparatus of claim 1, wherein the deflectable sidewall portion comprises a cantilevered tab, wherein the actuator displaces a portion of the cantilevered tab at least partially into the internal bore.

7. The apparatus of claim 1, further comprising a first and second slits extending through the sidewall of the pneumatic tube wherein the deflectable sidewall portion is disposed between the first and second slits, wherein the slits define a deflectable strip there between and wherein the actuator is operative to at least partially deflect the deflectable strip into the internal bore.

8. The apparatus of claim 1, wherein the deflectable sidewall portion comprises:
   a plurality of deflectable sidewall portions defined by a plurality of slits extending through the pneumatic tube and defining a plurality of deflectable strips.

9. The apparatus of claim 8, wherein the plurality of slits are parallel to a central axis of the internal bore.

10. The apparatus of claim 8, wherein the plurality of slits extend for a distance less than twice the first cross dimension of the pneumatic tube.

11. The apparatus of claim 1, further comprising:
   a housing disposed around and engaging an exterior surface of the pneumatic tube, wherein said deflectable sidewall portion is disposed within said housing.

12. The apparatus of claim 1, wherein the actuator comprises a first actuator at a first axial location along the length of the pneumatic tube and a second actuator at a second axial location along the length of the pneumatic tube.

13. The apparatus of claim 12, wherein the first actuator and the second actuator are independently controlled.

14. The apparatus of claim 13, wherein the first actuator produces a first displacement of the deflectable sidewall portion and the second actuator produces a second displacement of the deflectable sidewall portion, wherein the first displacement is different than the second displacement.

15. A brake for use in a pneumatic tube carrier system, comprising:
   a sidewall defining a bore extending between an inlet and an outlet and, the bore having a first cross dimension and having a plurality of slits extending through the sidewall defining a selectively deflectable sidewall portion, the bore being in communication with a length of pneumatic tubing;
   a first compression band circumferentially arranged exterior to the selectively deflectable sidewall portion at a first location along the sidewall; and,
   a first actuator engaged with the first compression band and operative to selectively tighten and loosen the compression band, wherein tightening the compression band compresses the deflectable sidewall portion to define a deflected bore having a second cross dimension at the first location, wherein the second cross dimension is less than the first cross dimension.

16. The apparatus of claim 15, wherein the plurality of slits are parallel to a central axis of the bore.

17. The apparatus of claim 15, wherein the plurality of slits extend axially for a distance less the for less than twice the diameter of the first cross dimension.

18. The apparatus of claim 15, further comprising:
   a housing extending around the deflectable sidewall portion and enclosing said slits.

19. The apparatus of claim 15, further comprising:
   a second compression band circumferentially arranged exterior to the selectively deflectable sidewall portion at a second location along the sidewall; and
   a second actuator engaged with the second compression band and operative to selectively tighten and loosen the second compression band.

20. The apparatus claim 19, wherein the first actuator and the second actuator are independently controlled.

21. The apparatus of claim 20, wherein the first actuator produces a first displacement of the selectively deflectable sidewall portion and the second actuator produces a second displacement of the selectively deflectable sidewall portion, wherein the first displacement is different than the second displacement.

22. A brake for use in a pneumatic tube carrier system, comprising:
   a pneumatic tube having a sidewall that at least partially defines an internal bore extending between an inlet and an outlet, wherein said internal bore has a first cross dimension sized to accommodate the passage of a pneumatic carrier there through;
   a plurality of deflectable sidewall portions evenly spaced about the circumference of the internal bore, wherein said deflectable sidewall portions are selectively deflectable relative to the internal bore to establish a second cross dimension at least at one axial location along a length of the pneumatic tube between the inlet and the outlet, wherein the second cross dimension is less than the first cross dimension;
   a band circumferentially arranged exterior to the plurality of deflectable sidewall portions; and
   an actuator in operative communication with the band, wherein the actuator is operative to displace the band to displace at least a portion of each of the plurality of deflectable sidewall portions relative to internal bore of the pneumatic tube.

23. The apparatus of claim 22, wherein the deflectable sidewall portions each comprise a cantilevered tab, wherein the actuator displaces a portion of the cantilevered tab at least partially into the internal bore.

* * * * *